Patented Sept. 29, 1936

2,055,609

UNITED STATES PATENT OFFICE 2,055,609

AR-TETRAHYDRO-NAPHTHOTHIAZOLES

Herbert A. Lubs and Arthur L. Fox, Wilmington, Del., assignors to E. I. du Pont de Nemours & Company, Wilmington, Del., a corporation of Delaware No Drawing. Application November 3, 1934, Serial No. 751,284

7 Claims. (Cl. 260—44)

This invention relates to ar-tetrahydro-naphthothiazoles and the methods of preparing the same.

An object of the present invention is to provide ar-tetrahydro-amino-naphthothiazoles which are new chemical compounds. A further object is to provide a method for preparing such new compounds. Other objects are to advance the art. Still other objects will appear hereinafter.

These objects may be accomplished in accordance with our invention which comprises reacting an ar-tetrahydro-naphthyl thiourea with any of the known oxidizing ring closing agents which will not disturb any of the hydrogens of the other ring. The resulting products are amino ar-tetrahydro-naphthothiazoles which are new chemical compounds. These new compounds are valuable as safety paper chemicals, as intermediates for dyestuffs and as insecticides.

The new chemical compounds of our invention may also be prepared by the action of thiocyanogen (SCN)$_2$ on the tetrahydro-naphthylamines. However, the preparation thereof from the ar-tetrahydro-naphthyl thioureas appears to be the most satisfactory.

The ar-tetrahydro-naphthyl thioureas are new chemical compounds which are disclosed in our copending application, Ser. No. 751,283 filed on even date herewith. This copending application also discloses the method of making such new thioureas. This method comprises reacting a salt of a strong inorganic nonoxidizing mineral acid and an ar-tetrahydro-naphthylamine with an alkali metal thiocyanate such as ammonium, sodium and potassium thiocyanates preferably in aqueous solution and at reflux temperatures.

The reaction taking place when practiced in accordance with the preferred form of our invention may be represented by the following equation.

Theoretically, the ring may close in either of two directions to yield either of the two compounds indicated above. However, because of the well known activity of the neighboring alpha position and the analogous ring closure of beta-naphthyl-thiourea, we believe that compound (1), the amino ar-tetrahydro 1:2-naphthothiazole is the more logical one to be formed.

There are a variety of ring closing agents which may be employed. Since this is essentially an oxidizing reaction, any oxidizing agent causing ring closure and not disturbing the hydrogens of the other ring will be satisfactory. Among such oxidizing ring closing agents we prefer to employ bromine, chlorine, sulphur chloride, sulphur bromide, sulphuryl chloride, sulphuryl bromide or mixtures of two or more thereof. The most satisfactory procedure appears to be based upon that disclosed in the copending application to A. L. Fox, filed May 27, 1930, Ser. No. 456,289 now Patent 1,987,614 granted January 15, 1935, wherein a mixture of sulphuryl chloride and bromine is employed. This preferred method has the advantage of being cheap to carry out and to give a product in excellent physical condition.

The reaction starts at room temperatures and is exothermic. Heat may be employed at the start of the reaction, if desired, but is generally unnecessary.

In order to more clearly illustrate our invention and the preferred modes of carrying the same into effect, the following example is given:

Example 1

20.6 parts of ar-tetrahydro-β-naphthyl-thiourea was dissolved in 100 parts of chlorbenzene. This mixture was rapidly agitated while a mixture of 7.5 parts of sulphuryl chloride and 1.3 parts of bromine in 30 parts of chlorbenzene were added from a dropping funnel. A vigorous

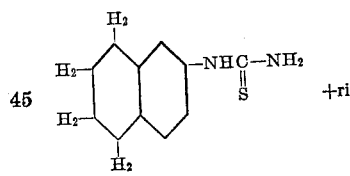 +ring closing agent= 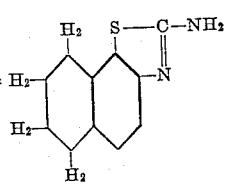 (1)

or

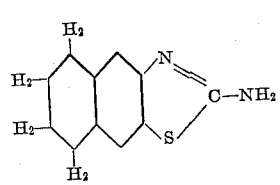 (2)

reaction ensued and complete solution of the product occurred. On further stirring, a yellow granular precipitate appeared and, after stirring for an hour, this precipitate was filtered off and washed. This product is a mixture of the hydrochloride and the hydrobromide of the amino ar-tetrahydro-naphthothiazole.

The free base may be prepared by dissolving the hydrohalide in water and precipitating with ammonia. This free base melts at 202 to 202.3° C.

Analysis N=13.51
Theory N=13.72

In place of the ar-tetrahydro-beta-naphthyl-thiourea, ar-tetrahydro-alpha-naphthyl thiourea may be employed with the production of the corresponding amino ar-tetrahydro-naphthothiazole. Also, other inert solvents or reaction media may be employed in place of the chlorbenzene, such as chloroform, ethylene dichloride, dichlorbenzene, carbon tetrachloride, benzene, toluene and the like.

While we have disclosed the preferred embodiments of our invention, it will be readily apparent to those skilled in the art that many variations and modifications may be made therein without departing from the spirit of our invention. Accordingly, the scope of our invention is to be limited solely by the appended claims, construed as broadly as is permissible in view of the prior art.

We claim:

1. A $\mu$-amino ar-tetrahydro-naphthothiazole.
2. The process which comprises treating an ar-tetrahydronaphthyl thiourea in an inert organic solvent with a ring closing agent of the group consisting of bromine, chlorine, sulphur chloride, sulphuryl chloride and mixtures of two or more of them.
3. The process which comprises treating an ar-tetrahydronaphthyl thiourea in an inert organic solvent with a mixture of sulphuryl chloride and bromine.
4. The process which comprises treating ar-tetrahydro-$\beta$-naphthyl thiourea in an inert organic solvent with a ring closing agent of the group consisting of bromine, chlorine, sulphur chloride, sulphuryl chloride and mixtures of two or more thereof.
5. The process which comprises treating ar-tetrahydro-$\beta$-naphthyl thiourea in an inert organic solvent with a mixture of sulphuryl chloride and bromine.
6. The compounds obtainable by the process of claim 5.
7. The $\mu$-amino ar-tetrahydro-naphthothiazole in which the nitrogen of the thiazole ring is bonded to the beta carbon atom of the benzene ring.

HERBERT A. LUBS.
ARTHUR L. FOX.